United States Patent [19]
Yamada

[11] Patent Number: 5,742,140
[45] Date of Patent: Apr. 21, 1998

[54] NUMERICAL-CONTROL MACHINE TOOL

[75] Inventor: Shigeru Yamada, Takaoka, Japan

[73] Assignee: Kitamura Machinery Co., Ltd., Japan

[21] Appl. No.: 545,728

[22] PCT Filed: Dec. 21, 1994

[86] PCT No.: PCT/JP94/02170

§ 371 Date: Nov. 2, 1995

§ 102(e) Date: Nov. 2, 1995

[87] PCT Pub. No.: WO95/28252

PCT Pub. Date: Oct. 26, 1995

[51] Int. Cl.[6] .................... G05B 19/408
[52] U.S. Cl. .............. 318/568.22; 318/632; 318/560; 318/689
[58] Field of Search .................. 318/632, 560, 318/689

[56] References Cited

U.S. PATENT DOCUMENTS 4,510,427   4/1985   Nozawa et al. ................ 318/590
5,021,941   6/1991   Ford et al. ..................... 364/176

FOREIGN PATENT DOCUMENTS 61-214949   9/1986   Japan .

*Primary Examiner*—William M. Shoop, Jr.
*Assistant Examiner*—Kim Lockett
*Attorney, Agent, or Firm*—Ronald P. Kananen

[57] ABSTRACT

A numerical-control machine tool has a plurality of positioning members (12, 13, 15) which are each driven along a positioning axis (x, y, z) by a feed screw (19, 20, 21). The arrangement is provided with a backlash compensation control arrangement (203, 204, 205) for compensating backlash errors of the positioning members (12, 13, 15) along the respective axes (x, y, z). This arrangement includes a memory (214) for storing backlash compensation values for each of a plurality of different driving modes, including a plurality of feed length modes defined on the basis of feed length, editing, memory operation, tape operation, MDI operation, different kinds of handle feed, jog feed, rapid feed, zero-return and the like type of variable.

9 Claims, 7 Drawing Sheets

NUMERICAL-CONTROL MACHINE TOOL

TECHNICAL FIELD

The present invention relates to a machine tool, and particularly to a numerical-control machine tool in which a plurality of backlash compensation values are set

BACKGROUND ART

A numerical-control machine tool has its feed stages or tables moved and positioned along the positioning axis by means of feed screws. The feed screws are driven by servo motors which are controlled by a numerical control equipment There has been proposed the compensation for the backlash of these feed screws.

For example, there has been proposed a scheme of compensation in which one backlash compensation register is provided for one positioning axis, a backlash compensation value is set in each register, and the backlash of feed screws is compensated based on the backlash compensation values.

The backlash compensation value is preset based on the degree of backlash of the feed screw. The degree of backlash is a mean value of actually measured values.

However, a numerical-control machine tool with the provision of the above-mentioned backlash compensation resistors behaves to have slightly different positioning errors between the high-speed feed mode and the low-speed feed mode. The reason for that is the occurrence of a different degree of backlash depending on the kind of mode and feed rate.

On this account, there is a drawback of degraded machining accuracy.

Particularly, recent numerical-control machine tools operate at increased feed rates, which results in an increased difference between feed rates of the high-speed feed mode and low-speed feed mode, and a resulting difference of positioning errors adversely affect the machining accuracy.

DISCLOSURE OF INVENTION

An object of the present invention is to provide a numerical-control machine tool capable of compensating the backlash depending on the kind of mode and feed rate.

The first of the present invention resides in a numerical-control machine tool characterized in the provision of a plurality of backlash compensation registers for one positioning axis.

The second of the present invention resides in a numerical-control machine tool characterized in the provision of memory means of backlash compensation values for each of at least one positioning axis, with each backlash compensation value memory means storing a plurality of backlash compensation values in correspondence to modes.

BEST MODE FOR CARRYING OUT THE INVENTION

The numerical-control machine tool based on a preferred embodiment of this invention will be explained with reference to FIG. 1 through FIG. 7.

This numerical-control machine tool is a vertical machining center, and it includes a machine tool main body 1, a numerical control equipment 2, an operator's panel 3, and a dam file on-line system 4.

Machine Tool Main Body 1

Figure 1:
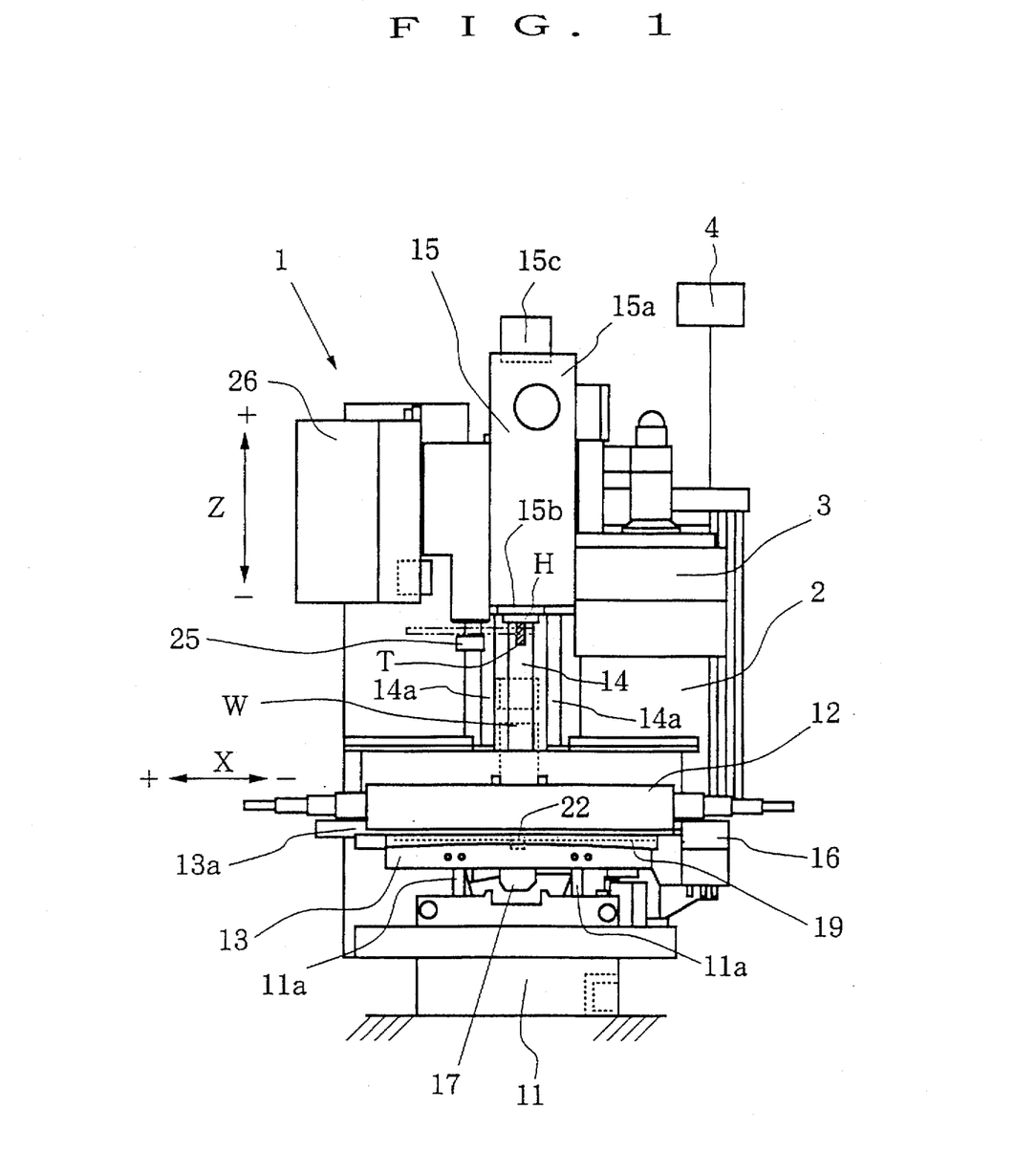
FIG. 1 is a front view of the numerical-control machine tool based on a preferred embodiment of this invention.
Figure 2:
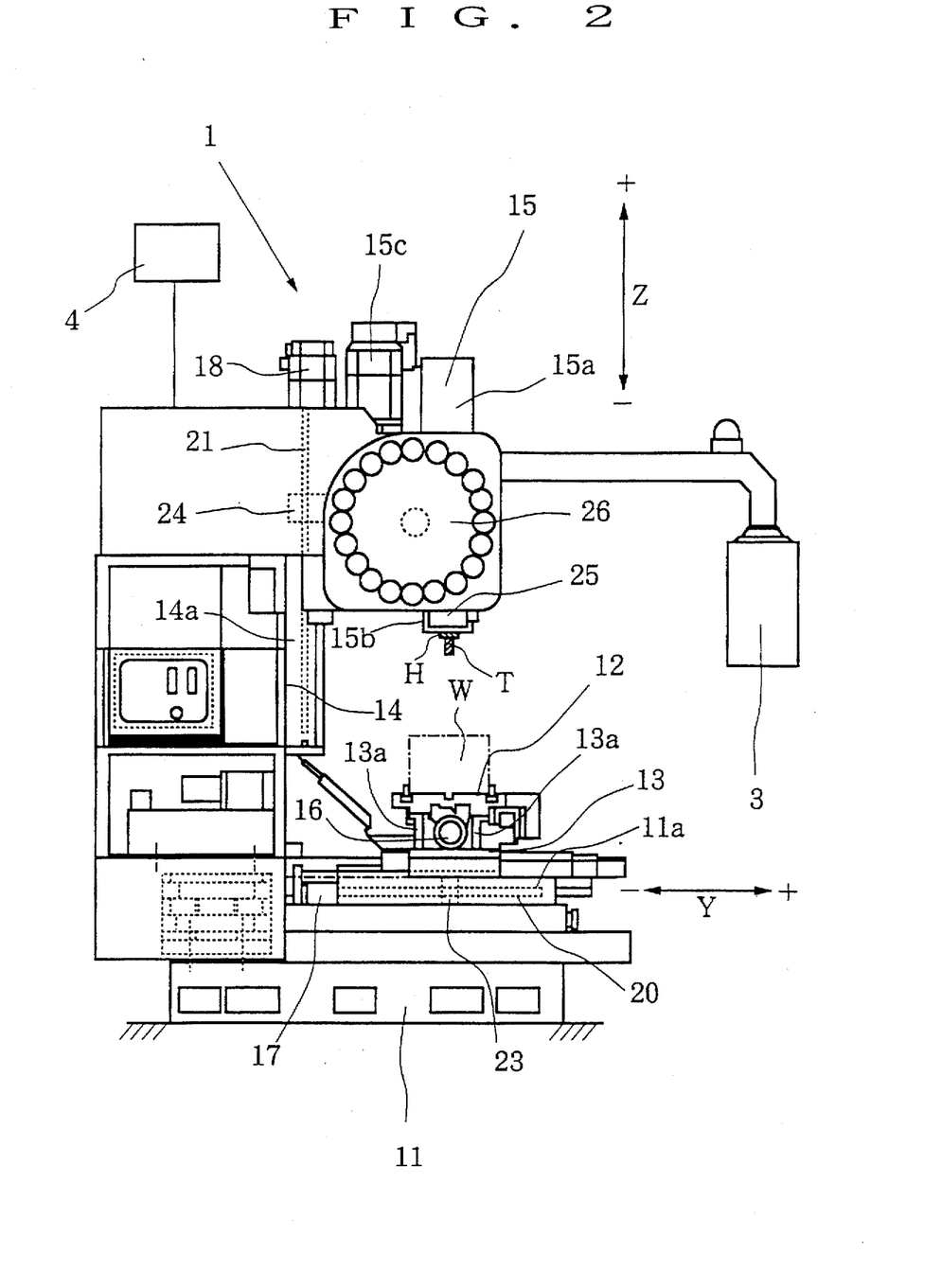
FIG. 2 is a side view of the numerical-control machine tool shown in FIG. 1.

The machine tool main body 1 will be explained with reference to FIG. 1 and FIG. 2.

The machine tool main body 1 includes a bed 11, a first table 12, a second table 13, a column 14, a spindle head 15, a first through third servo motors 16–18, a first through third feed screws 19–21, a first through third nuts 22–24, an automatic tool changer 25, a tool magazine 26, and a first through third mils 13a, 11a and 14a.

The first servo motor 16 and first rail 13a are fixed on the second table 13. The first table 12 is fitted movably in the X-axis direction relative to the first rail 13a. The X axis is a horizontal axis line extending in the right-left direction.

The first feed screw 19 is fixed on the drive shaft of the first servo motor 16, and it is rotated by the first servo motor 16. The first nut 22 is fixed on the first table 12, and it engages with the first feed screw 19. The first feed screw 19 and first nut 22 are a ball screw and ball nut. The first table 12 and first nut 22 are adapted to move along the X axis in its "+" and "−" directions with respect to the second table 13 in response to the forward rotation and reverse rotation, respectively, of the first feed screw 19.

Figure 6:
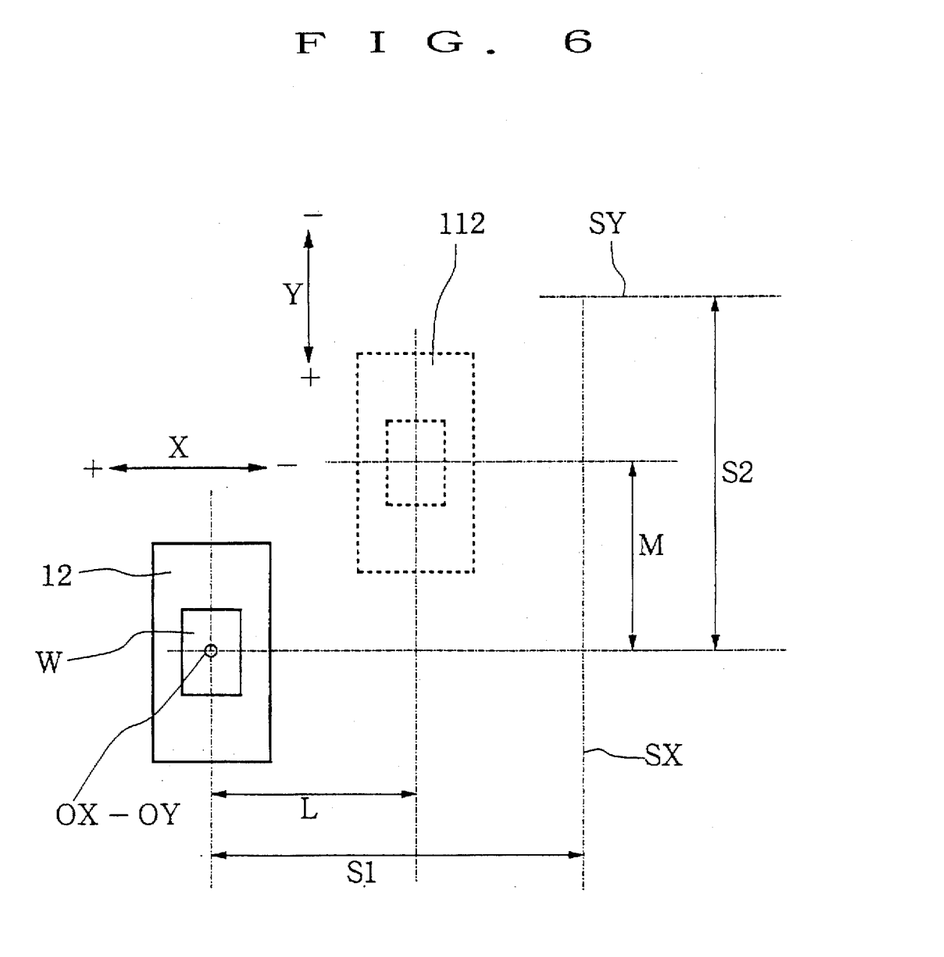
FIG. 6 is a diagram used to explain the feeding in the X-axis direction and Y-axis direction.
Figure 7:
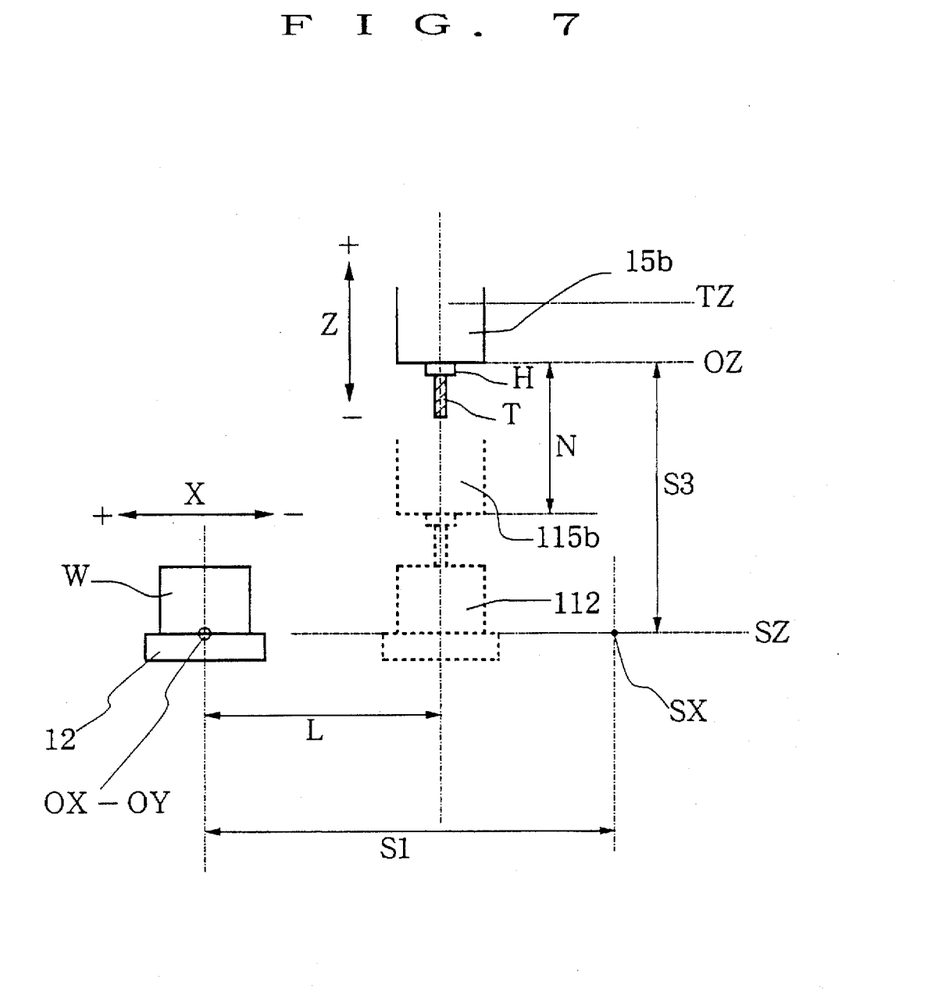
FIG. 7 is a diagram used to explain the feeding in the X-axis direction and Z-axis direction.

The first table 12 can move within the range of X-axis stroke S1 which is defined by the X-axis origin position OX and X-axis stroke end position SX of the machine as shown in FIG. 6 and FIG. 7.

The second servo motor 17 and second rail 11a are fixed on the bed 11. The second table 13 is fitted movably in the Y-axis direction relative to the second rail 11a. The Y axis is a horizontal axis line extending in the front-rear direction, and it is orthogonal to the X axis.

The second feed screw 20 is fixed on the drive shaft of the second servo motor 17, and it is rotated by the second servo motor 17. The second nut 23 is fixed on the second table 13, and it engages with the second feed screw 20. The second feed screw 20 and second nut 23 are a ball screw and ball nut. The second table 13 and second nut 23 are adapted to move along the Y axis in its "+" and "−" directions with respect to the bed 11 in response to the forward rotation and reverse rotation, respectively, of the second feed screw 20.

The second table 13 can move within the range of Y-axis stroke S2 which is defied by the Y-axis origin position OY and Y-axis stroke end position SY of the machine as shown in FIG. 6.

The third servo motor 18 and third rail 14a are fixed on the column 14. The column 14 is fixed on the bed 11. The spindle head 15 is fitted movably in the Z-axis direction relative to the third rail 14a. The Z axis is a vertical axis line extending in the up-down direction, and it is orthogonal to the X axis and Y axis.

The third feed screw 21 is fixed on the drive shaft of the third servo motor 18, and it is rotated by the third servo motor 18. The third nut 24 is fixed on the spindle head 15, and it engages with the third feed screw 21. The third feed screw 21 and third nut 24 are a ball screw and ball nut. The spindle head 15 and third nut 24 are adapted to move along the Z axis in its "+" and "−" directions with respect to the column 14 in response to the forward rotation and reverse rotation, respectively, of the third feed screw 21.

The spindle head 15 can move within the range of Z-axis stroke S3 which is defined by the Z-axis origin position OZ and Z-axis stroke end position SZ of the machine as shown in FIG. 7. At the time of replacing a tool holder H, which will be explained later, the spindle head 15 can be raised higher up to the Z-axis tool change position TZ.

In this numerical-control machine tool, the X axis, Y axis and Z axis are all positioning axes.

A work W is mounted detachably on the first table 12.

The spindle head 15 includes a spindle head main body 15a, a spindle 15b, and a spindle drive motor 15c.

The spindle 15b is fitted rotatably on the spindle head main body 15a. The spindle drive motor 15c is fitted in the spindle head main body 15a, and it drives the spindle 15b. The tool holder H is mounted detachably on the spindle 15b. The tool holder H holds a tool T.

The automatic tool changer 25 and tool magazine 26 are fitted on the column 14. The tool magazine 26 has many tool holders (not shown), and each tool holder has a tool.

The automatic tool changer 25 enables the tool holder H on the spindle 15b to be replaced with an arbitrary tool holder in the tool magazine 26.

Numerical Control Equipment 2

Figure 3:
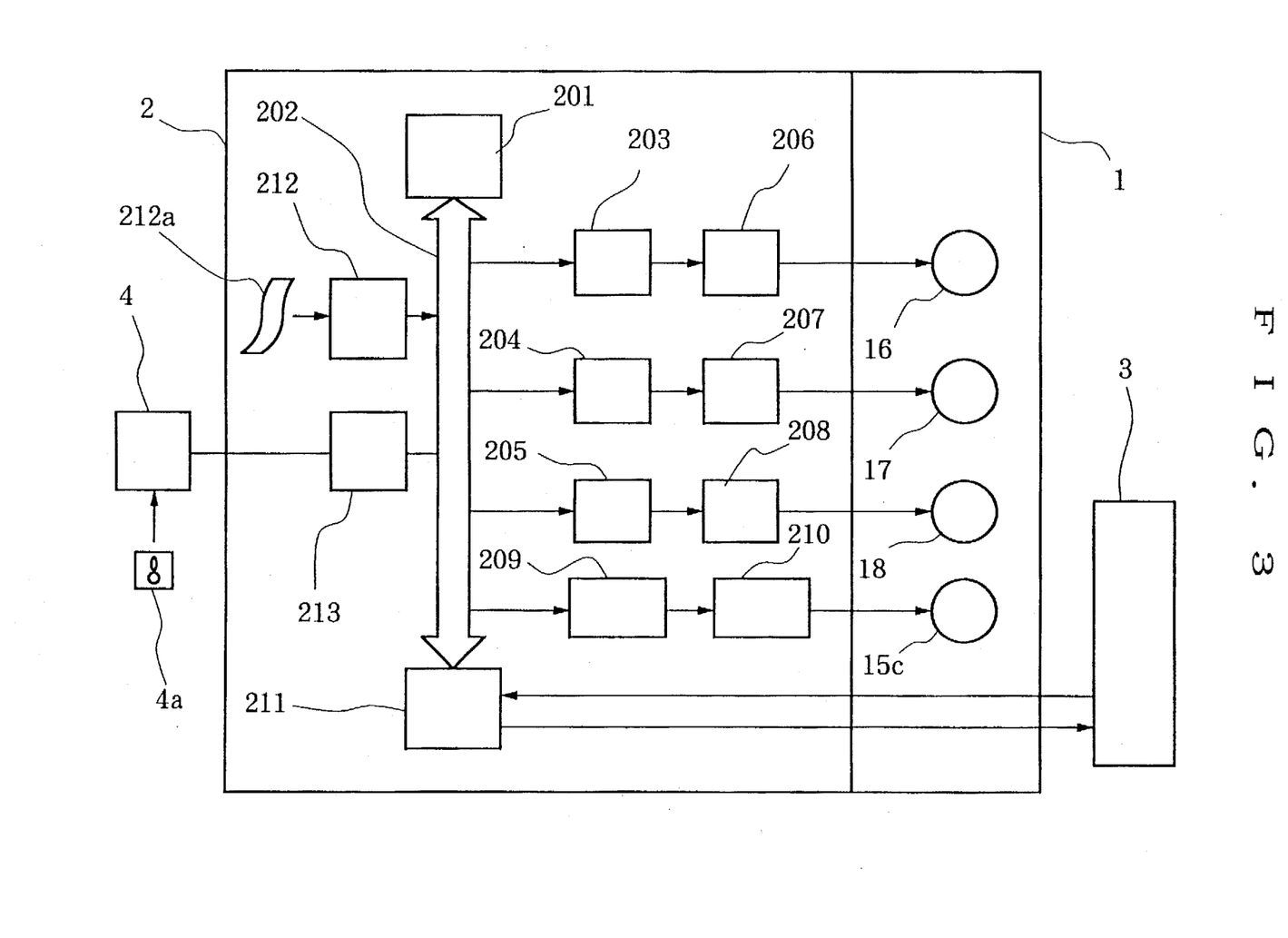
FIG. 3 is a block diagram showing the electrical connection in the numerical-control machine tool shown in FIG. 1.

Next, the numerical control equipment 2 will be explained with reference to FIG. 3. FIG. 3 shows briefly the electrical connection in the numerical-control machine tool.

The numerical control equipment 2 includes a central processor 201, an address/dam bus 202, a first through third backlash compensation means 203–205, a first through third servo amplifiers 206–208, an interface circuit 209, a sequence controller 210, a first input/output device 211, a tape reader 212, and a second input/output device 213.

The central processor 201 and first input/output device 211 are connected electrically to the first through third backlash compensation means 203–205, interface circuit 209, tape reader 212, and second input/output device 213 through the address/dam bus 202. Based on the electrical connection, these devices can send and receive signals and program data.

Figure 4:
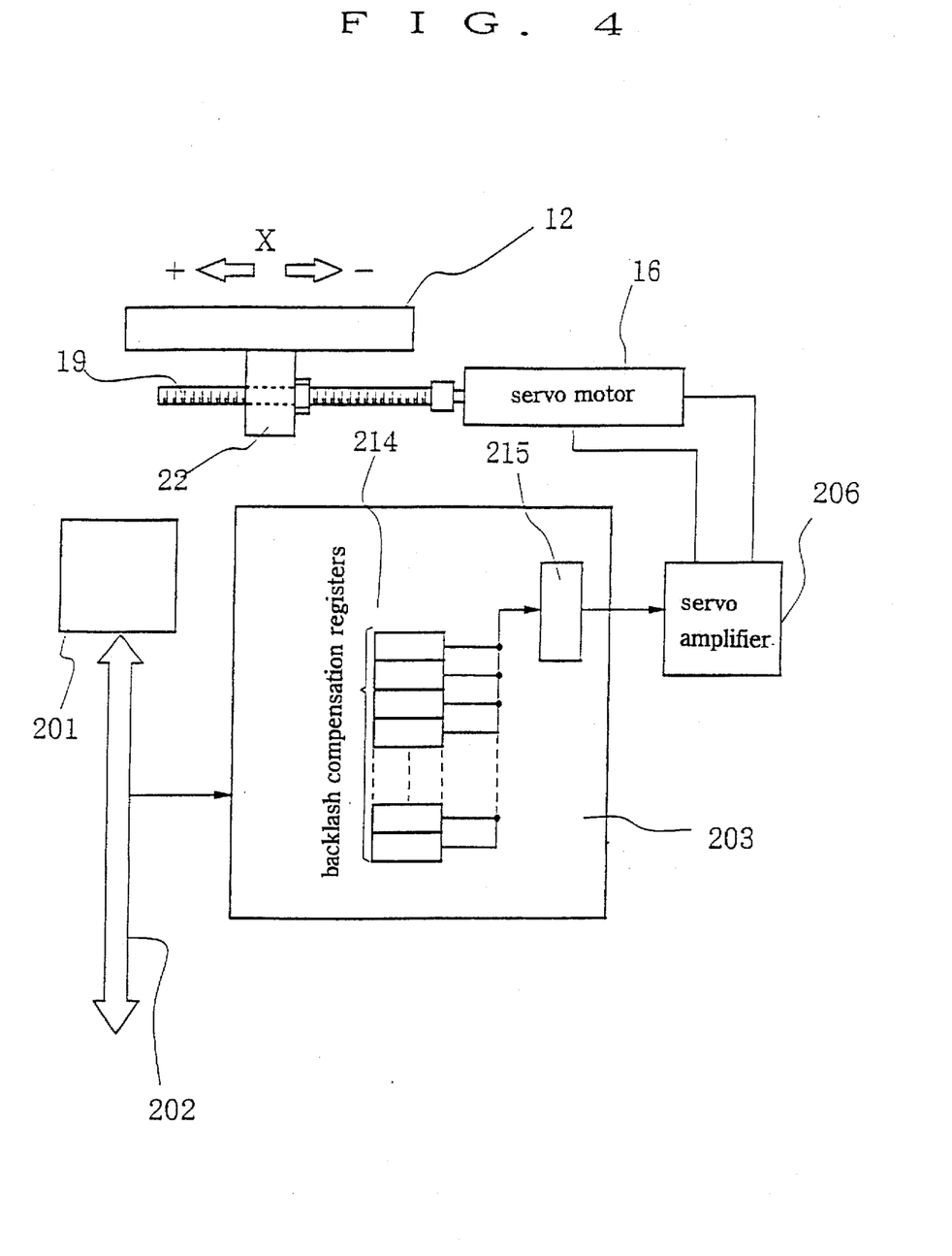
FIG. 4 is a diagram used to explain the backlash compensation for the first feed screw.

The first backlash compensation means 203 will be explained with reference to FIG. 4. FIG. 4 shows briefly the first table 12, first servo motor 16, first feed screw 19, first nut 22, central processor 201, address/data bus 202, first backlash compensation means 203, and first servo amplifier 206, with the remainder being omitted.

The first backlash compensation means 203 includes a backlash compensation value memory means and a servo command signal modification means 215.

The backlash compensation value memory means consists of ten backlash compensation registers 214, which are connected electrically to the servo command signal modification means 215. Each of the backlash compensation registers 214 stores a backlash compensation value in advance. These backlash compensation values correspond to degrees of backlash of the first feed screw 19 relevant to ten kinds of mode which will be explained later. These degrees of backlash are evaluated by a known method. For example, the backlash is measured actually in each mode, or it is calculated theoretically.

The second and third backlash compensation means 204 and 205 have the same arrangement as the first backlash compensation means 203, and their backlash compensation values correspond to degrees of backlash of the second and third feed screws 19 and 20.

The first through third backlash compensation means 203–205 are connected electrically to the first through third servo motors 16–18 by way of the first through third servo amplifiers 206–208.

The spindle drive motor 15c is connected electrically to the interface circuit 209 by way of the sequence controller 210.

The tape reader 212 reads program data recorded on an NC tape 212a, and sends it to the central processor 201.

Operator's panel 3

Figure 5:
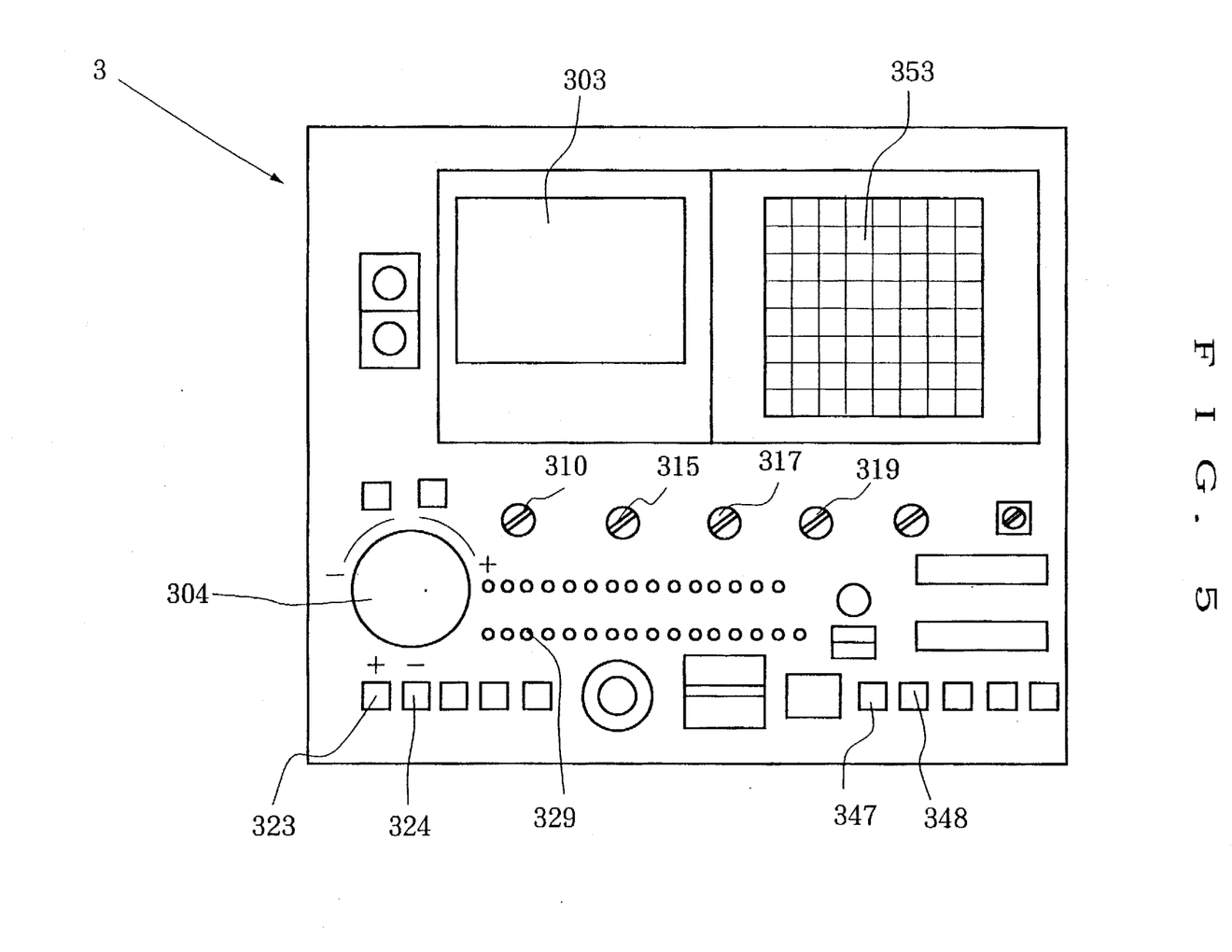
FIG. 5 is a front view of the operator's panel of the numerical-control machine tool shown in FIG. 1.

The operator's panel 3 is connected to the first input/output device 211. The operator's panel 3 includes a CRT character display 303, a manual pulse generator 304, a manual feed rate setting switch 310, a feed axis selector switch 315, a mode selector switch 317, a rapid feed rate override switch 319, a manual feed "+" direction switch 323, a manual feed "−" direction switch 324, a dry-run switch 329, an automatic operation start switch 347, an automatic operation halt switch 348, and a keyboard 353.

The CRT character display 303 is capable of displaying concurrently various data and accompanying remarks.

The manual pulse generator 304 enables the operator to make a stepping feed by rotating its handle when this feed mode is selected by the mode selector switch 317.

The manual feed rate setting switch 310 is used to establish a manual (JOG) feed rate. This manual feed rate setting switch 310 functions as a feed rate override switch during the automatic operation mode. Specifically, it enables the operator to override the feed rate programmed on the NC tape within a 0–200% range at intervals of 10%. The cutting feed rate ranges from 0 to 5000 mm/min, and the maximum feed rate is 5000 mm/min. The feed rate override switch has no effect for a feed rate programmed in the tapping cycle G84, and the spindle speed is not changed manually or by MDI during the tapping Operation.

The feed axis selector switch 315 is used to select a positioning axis, i.e., one of the X axis, Y axis and Z axis, for the manual feed.

The mode selector switch 317 is used to select one of ten kinds of mode. The ten kinds of mode include editing, memory operation, tape operation, MDI operation, three kinds of handle feed, jog feed, rapid feed, and zero-return. The three kinds of handle feed include stepping feed in 0.001 mm, 0.01 mm and 0.1 mm units, or in 0.0001 inch, 0.001 inch and 0.01 inch units. The memory operation, tape operation and MDI operation are automatic operation modes, and handle feed, jog feed, rapid feed and zero-return are manual operation modes.

The rapid feed rate override switch 319 is effective to override the rapid feed rate to its 1, 25, 50 or 100% level.

The manual feed "+" direction switch 323 is pressed to make a manual feed in the "+" direction of a feed axis. The feed rate is selected by the manual feed rate setting switch 310.

The manual feed "−" direction switch 324 is similar to the manual feed "+" direction switch 323, except that it is pressed to make a manual feed in the "−" direction.

The dry-run switch 329 invalidates the feed rate programmed on the NC tape and validates the feed rate specified by the manual feed rate setting switch 310, and it is used for the verification of NC tape or the like.

The automatic operation Start switch 347 commences the tape operation, MDI operation or memory operation.

The automatic operation halt switch 348 is pressed during the tape operation or MDI operation to halt the operation of the numerical control equipment 2. This switch does not stop the spindle 15b nor shut off the cutting fluid. The automatic operation is resumed when the automatic operation start switch 347 is pressed.

The keyboard 353 is used by the operator to enter program data to the central processor 201.

Data File on-line System 4

Next, the data file on-line system 4 will be explained.

The data file on-line system 4 is connected electrically to the second input/output device 213, and it reads program data out of a floppy disk 4a. The read-out program data is sent to the central processor 201 by way of the second input/output device 213.

Backlash Compensation

Next, the backlash compensation for the first feed screw 19 will be explained.

In each mode, which will be explained later, the mode signal that indicates the mode and the feed rate command signal, feed value command signal and feed direction command signal for the X axis are sent to the first backlash compensation means 203.

In the first backlash compensation means 203, the backlash compensation value for the selected mode is sent from the backlash compensation register 214 to the servo command signal modification means 215. The servo command signal modification means 215 modifies the feed value command signal based on the backlash compensation value and sends the modified signal together with the feed rate command signal and feed direction command signal to the first servo amplifier 206.

The first servo amplifier 206 controls the first servo motor 16 in accordance with the feed rate command signal, feed direction command signal and modified feed value command signal. Consequently, the first feed screw 19 rotates to move the first table 12. The feed rate, feed direction and feed value are in accordance with the feed rate command signal, feed direction command signal and modified feed value command signal, respectively.

Based on the modification of the feed value command signal in this manner, the first feed screw 19 has its backlash compensated depending on the mode.

The backlash compensation for the second and third feed screws 20 and 21 is identical to that for the first feed screw 19, and the explanation thereof is omitted.

In this manner, the first through third feed screws 19–21 have their backlash compensated depending on the mode, and the first table 12, second table 13 and spindle head 15 are positioned accurately on the X axis, Y axis and Z axis, respectively.

In case the backlash of the first through third feed screws 19–21 is not compensated depending on the mode, there arise positioning errors inherent to kinds of mode. The reason for that is the imposition of a different load on the feed screw and thus the occurrence of a slightly different degree of backlash depending on the kind of mode.

Centering of Work W

Next, the centering operation of the work W will be explained with reference to FIG. 6 and FIG. 7.

Initially, the operator selects the rapid feed with the mode selector switch 317, specifies the feed rate with the rapid feed rate override switch 319, and selects the X axis with the feed axis selector switch 315. Consequently, the mode signal, feed rate command signal, feed value command signal and feed direction command signal for the rapid feed are sent to the first backlash compensation means 203.

In the first backlash compensation means 203, the backlash compensation value for the rapid feed is sent from the backlash compensation register 214 to the servo command signal modification means 215. The servo command signal modification means 215 modifies the feed value command signal in accordance with the backlash compensation value, and sends the modified signal together with the feed rate command signal and feed direction command signal to the first servo amplifier 206.

The first servo amplifier 206 controls the first servo motor 16 in accordance with the feed rate command signal, feed direction command signal and modified feed value command signal thereby to carry out the rapid feed of the first table 12. Accordingly, the first feed screw 19 has its backlash compensated depending on the mode, and the first table 12 is positioned by being moved by distance L in the X-axis "−" direction from the origin position OX, OY of the X-Y axis of the machine.

Subsequently, the operator selects the Y axis with the feed axis selector switch 315, and presses the manual feed "−" direction switch 324. Consequently, the mode signal, feed rate command signal, feed value command signal and feed direction command signal for the rapid feed are sent to the second backlash compensation means 204.

The second backlash compensation means 204 modifies the feed value command signal in accordance with the backlash compensation value for the rapid feed in the same manner as the first backlash compensation means 203, and sends the modified signal together with the feed rate command signal and feed direction command signal to the second servo amplifier 207.

The second servo amplifier 207 controls the second servo motor 17 in accordance with the feed rate command signal, feed direction command signal and modified feed value command signal thereby to carry out the rapid feed of the second table 13. Accordingly, the second feed screw 20 has its backlash compensated depending on the mode, and the second table 13 is positioned by being moved by distance M in the Y-axis "−" direction. Consequently, the first table 12 and work W are positioned to the first specified position 112.

Subsequently, the operator selects the Z axis with the feed axis selector switch 315, and presses the manual feed "−" direction switch 324. Consequently, the mode signal, feed rate command signal, feed value command signal and feed direction command signal for the rapid feed are sent to the third backlash compensation means 205.

The third backlash compensation means 205 modifies the feed value command signal in accordance with the backlash compensation value for the rapid feed in the same manner as the first backlash compensation means 203, and sends the modified signal together with the feed rate command signal and feed direction command signal to the third servo amplifier 208.

The third servo amplifier 208 controls the third servo motor 18 in accordance with the feed rate command signal, feed direction command signal and modified feed value command signal thereby to carry out the rapid feed of the spindle head 15. Accordingly, the third feed screw 21 has its backlash compensated depending on the mode, and the spindle head 15 and tool T are positioned to the second specified position 115b by being moved by distance N in the Z-axis "−" direction from the Z-axis origin position OZ of the machine.

By the positioning of the tool T and work W in this manner, the work W is coarsely centered. In the illustrated case, centering the work W is to make the center lines of the tool T and work W coincident.

After that, the operator carries out the fine adjustment of centering based on the manual feed as follows.

Initially, the operator selects the manual feed with the mode selector switch 317, specifies the feed rate with the manual feed rate setting switch 310, selects the X axis with the feed axis selector switch 315, and presses the manual feed "+" direction switch 323 or manual feed "−" direction switch 324. Consequently, the mode signal, feed rate command signal, feed value command signal and feed direction command signal for the manual feed are sent to the first backlash compensation means 203.

The first backlash compensation means 203 modifies the feed value command signal based on the backlash compensation value for the manual feed, and sends the modified signal together with the feed rate command signal and feed direction command signal to the first servo amplifier 206.

The first servo amplifier 206 controls the first servo motor 16 thereby to carry out the manual feed of the first table 12 in the X-axis "+" or "−" direction in the same manner as described previously. Accordingly, the first feed screw 19 has its backlash compensated depending on the mode, and the fine adjustment of centering for the X-axis direction is implemented accurately.

Subsequently, the operator selects the Y axis with the feed axis selector switch 315 and presses the manual feed "+" direction switch 323 or manual feed "−" direction switch 324. Then, the fine adjustment of centering for the Y-axis direction is implemented in the same manner as the flue adjustment of centering for the X-axis direction.

Subsequently, the operator selects the Z axis with the feed axis selector switch 315 and presses the manual feed "+" direction switch 323 or manual feed "−" direction switch 324. The fine adjustment of centering for the Z-axis direction is implemented in the same manner as the fine adjustment of centering for the X-axis direction.

The fine adjustment of centering based on the manual feed takes place in this manner. In the case of carrying out the fine adjustment of centering by controlling the feed value more precisely than that accomplished by the manual feed, the following handle feed is followed.

Initially, the operator selects the handle feed, e.g., the stepping feed in 0.1-mm units, with the mode selector switch 317. Subsequently, the operator selects the X axis with the feed axis selector switch 315, and rotates the handle of the manual pulse generator 304. Consequently, the mode signal, feed rate command signal, feed value command signal and feed direction command signal for the 0.1-mm stepping feed are sent to the first backlash compensation means 203.

The first backlash compensation means 203 modifies the feed value command signal based on the backlash compensation value for the 0.1-mm stepping feed, and sends the modified signal together vth the feed rate command signal and feed direction command signal to the first servo amplifier 206.

The first servo amplifier 206 controls the first servo motor 16 thereby to carry out the stepping feed of the first table 12 in the X-axis "+" or "−" direction. Accordingly, the first feed screw 19 has its backlash compensated depending on the mode, and the first table 12 is moved in 0.1-mm units thereby to implement the fine adjustment of centering for the X-axis direction.

Subsequently, the operator selects the Y axis with the feed axis selector switch 315 and rotates the handle of the manual pulse generator 304. Then, the fine adjustment of centering for the Y-axis direction is implemented in the same manner as the fine adjustment of centering for the X-axis direction.

Subsequently, the operator selects the Z axis with the feed axis selector switch 315 and rotates the handle of the manual pulse generator 304. Then, the fine adjustment of centering for the Z-axis direction is implemented in the same manner as the fine adjustment of centering for the X-axis direction.

On completion of centering, the position is stored in the central processor 201 so that successive centering operations can be carried out automatically.

Cutting Operation of Work W

Next, the cutting operation of the work W will be explained.

Following the centering of the work W, the cutting operation of the work W is carried out in the automatic operation mode as follows.

The operator selects a mode from among the memory operation, tape operation and MDI operation with the mode selector switch 317. Consequently, the mode signal of the selected mode is sent to the first through third backlash compensation means 203–205.

Subsequently, the operator stores program data in the central processor 201. This means will be explained in detail later.

Subsequently, the operator initiates the automatic operation with the automatic operation start switch 347. Consequently, the servo command signals for the X axis, Y axis and Z axis are sent to the first through third backlash compensation means 203–205, respectively, in accordance with the program data.

The first through third backlash compensation means 203–205 modify the feed value command signals in accordance with the backlash compensation values for the mode, and sends the modified signals together with the feed rate command signals and feed direction command signals to the third servo amplifier 208.

The first, second and third servo amplifiers 206–208 control the first through third servo motors 16–18 in accordance with the feed rate command signals, feed direction command signals and modified feed value command signals thereby to implement the cutting feed. At the same time, the sequence controller 210 controls the spindle drive motor 15c in accordance with the program data thereby to turn the spindle 15b and tool T.

Consequently, the work W undergoes the cutting operation by the tool T. Since the first through third feed screws 19–21 have their backlash compensated depending on the mode, the cutting operation takes place accurately.

The means of storing the above-mentioned program data in the central processor 201 differs depending on the kind of mode, as will be explained separately in the following.

In the case of the memory operation, the data file on-line system 213 reads program data out of the floppy disk 4a and stores it in the memory of the central processor 201.

In the case of the tape operation, the tape reader 212 reads program data on the NC tape 212a and sends it to the central processor 201.

In the case of the MDI operation, the operater enters program data by using the keyboard 353 and stores it in the memory of the central processor 201.

Variant Embodiments

The present invention is not confined to the foregoing embodiment For example, the invention can be applied not only to the backlash compensation for the first table, column, second table and spindle head, but also to the backlash compensation for other feed stages.

The positioning axes are not confined to the X axis, Y axis and Z axis.

The kind of mode is not confined to the foregoing modes, but other modes can also be adopted, and the number of kinds of mode is arbitrary. A plurality of backlash compensation values are set in correspondence to modes for each positioning axis also in this case.

The backlash compensation value memory means is not confined to the backlash compensation registers. Instead, an alternative scheme may be such that for the memory operation, backlash compensation values are stored on the floppy disk, and they are read out together with program data into the backlash compensation means for implementing the compensation. Namely, the backlash compensation value memory means may generically be means of setting a plurality of backlash compensation values for each positioning axis.

Backlash compensation values may be set not only in correspondence to modes, but also in correspondence to feed rates. In this case, it is possible to implement the backlash compensation in response to the feed rate.

The machine tool main body is not confined to the foregoing structure, but structures of other conventional numerical-control machine tools can also be adopted.

According to the first of the present invention, a plurality of backlash compensation registers are provided for one positioning axis so that a plurality of backlash compensation values can be set in correspondence to modes or feed rates. Accordingly, the backlash can be compensated depending on the mode or feed rate, and the positioning accuracy can be enhanced.

According to the second of the present invention, memory means of backlash compensation values is provided for each of at least one positioning axis, with each backlash compensation value memory means storing a plurality of backlash compensation values in correspondence to a plurality of modes, so that the backlash of each positioning axis can be compensated depending on the mode. Consequently, the positioning accuracy in each mode can be enhanced.

I claim:

1. A numerical-control machine tool for compensating backlash errors of a positioning member (12, 13, 15) driven along at least one positioning axis (x, y, z) by a feed screw (19, 20, 21), comprising:

at least one backlash compensation means (203, 204, 205) for compensating backlash errors of said positioning member (12, 13, 15) along said axis (x, y, z), the backlash compensation means (203, 204, 205) having a memory means (214) for storing a plurality of backlash compensation values in accordance with a plurality of driving modes, the driving modes including a plurality of feed length modes being defined on the basis of feed length, wherein the plurality of driving modes are selected from the group consisting of an editing, a memory operation, a tape operation, an MDI operation, three kinds of handle feed, a jog feed, a rapid feed, and a zero-return.

2. A numerical-control machine tool according to claim 1, wherein the plurality of driving modes further includes manually operated handle feed modes having various feeding steps, whereby a centering operation can be performed effectively.

3. A numerical-control machine tool according to claim 1, wherein the plurality of driving modes further includes a plurality of feed speed modes being defined on the basis of feed speed.

4. A numerical-control machine tool according to claim 1, wherein the three kinds of handle feed consists of a stepping feed in 0.001 mm unit, a stepping feed in 0.01 mm unit and a stepping feed in 0.1 mm unit.

5. A numerical-control machine tool according to claim 1, wherein the three kinds of handle feed consist of a stepping feed in 0.001 inch unit, a stepping feed in 0.01 inch unit and a stepping feed in 0.1 inch unit.

6. A numerical-control machine tool according to claim 1, wherein the memory operation, the tape operation and the MDI operation are automatic operation modes, while the handle feed, the jog feed, the rapid feed and the zero-return are manual operation modes.

7. A numerical-control machine tool according to claim 1, wherein the positioning member is a table (12, 13) on which a workpiece (W) is detachably fixed, the table (12, 13) being driven along at least one positioning axis (x, y) by a feed screw (19, 20).

8. A numerical-control machine tool according to claim 1, wherein the positioning member is a spindle head (15) on which a tool holder (11) having a tool (T) is detachably attached, the spindle head (15) being driven along at least one positioning axis (z) by a feed screw (21).

9. A numerical-control machine tool according to claim 1, wherein the plurality of compensation values are predetermined by actual measurement or by theoretical calculation.

\* \* \* \* \*